Patented May 4, 1948

2,441,069

UNITED STATES PATENT OFFICE 2,441,069

2-AMINO-METHYL-INDENES AND THEIR PRODUCTION

Karl Hoffmann and Henri Schellenberg, Basel, and Karl Miescher, Riehen, Switzerland, assignors to Ciba Pharmaceutical Products Incorporated, Summit, N. J., a corporation of New Jersey No Drawing. Application May 15, 1944, Serial No. 535,740. In Switzerland August 20, 1943

7 Claims. (Cl. 260—293)

It has been found that new amines can be obtained if indane compounds which contain in the five membered ring an aminoalkyl group and as further substituent a free or substituted hydroxyl group, are subjected to a treatment which eliminates the latter substituent together with the hydrogen atom attached to a neighbouring carbon atom, with the formation of a double bond and, if necessary, the resultant amines converted into the corresponding ammonium compounds.

The starting compounds which have not previously been described can be prepared as follows: Indanones are caused to react with carbonyl compounds and substances which contain an >NH group. The chief indanones which may be used are the following : α-indanone and its derivatives substituted in one or both rings, the substituent being, for example, a hydroxy, alkoxy, aralkoxy, acyloxy, alkyl, nitro, amino, alkylamino, acylamino, carbalkoxy group, or halogen. The carbonyl compound most suitable for this reaction is formaldehyde. Suitable compounds containing the >NH group are: dimethylamine, diethylamine, dipropylamine, dibutylamine, methylethylamine, methylpropylamine, methylbenzylamine, methylstearylamine, diallylamine, diethanolamine, methylamine, ethylamine, allylamine, diethylaminoethylamine, aniline, N-methylaniline, naphthylamines, piperidine, morpholine, pyrrolidine, imidazoline, thiazolidine, tetrahydroisoquinoline, perhydroquinoline, phenmorpholine, aminopyridine, benzylaminopyridine, aminothiazol, benzylaminothiazol, their derivatives substitued in the nucleus, and ammonia. The amines mentioned are most suitably used in the form of their salts.

The aminoketones obtained in this way can be reduced to the corresponding carbinols in a known manner. Suitable reduction agents are for example, amalgams such as sodium or aluminium amalgan, catalytically activated hydrogen, for which platinum, palladium, or nickel can be used as catalysts. Agents which are capable of converting the >CO group into the

group (where R represents for example an alkyl, aralkyl or aryl group) after the manner of a Grignard reagent, are also suitable for this purpose. The carbonols described can however also be prepared in other ways. They can be prepared, for example, by reacting the corresponding substituted halogen-alkyl-indanes with amines. Suitable parent compounds are also obtained when indanones are treated with cyanohydrin, and the nitriles formed reduced to the corresponding amines. In all these carbinols the hydroxyl group may, if necessary, be substituted, i. e. esterified or etherified, for example by means of carboxylic acids such as acetic, propionic or benzoic acid, by means of sulfonic acids, hydrohalic acids or xanthic acids, or by means of a benzyl or triphenylmethyl residue.

The elimination of the free or substituted hydroxyl group which is present in the alicyclic rings, with the formation of a double bond, is carried out by means of agents which are known to effect this reaction. For example, a free hydroxyl group can be eliminated by the action of mineral acids, preferably in solvents such as glacial acetic acid, alcohol, dioxane, etc., of zinc chloride, bisulfates, formic acid, acetic acid, oxalic acid, toluenesulfonic acid, of acid anhydrides and halides, such as acetic anhydride, benzoyl chloride, phosphorus pentoxide or halides of phosphorus, carboxylic acid salts, or of catalysts such as iodine. The elimination of a tertiary hydroxyl group such as occurs, for example, in the Grignard reaction mentioned above can also be effected if desired by the action of a Grignard reagent at increased temperature. A correspondingly esterified hydroxyl group can also be eliminated by means of alkalies, alkaline earths, carbonates, carboxylic acid salts, organic bases such as pyridine, dimethylaniline, etc. Instead of, or in combination with the agents mentioned, increased temperature and/or decreased pressure can be used. If necessary the reaction can be carried out in the presence of inert gases. Instead of splitting off hydrohalide directly from hydrohalic acid esters, the halogen may be replaced in a known way by a quaternary ammonium radical, and the latter eliminated.

The products of the reaction obtained in this way are amino-alkyl-indenes, which generally distil off undecomposed and form well-crystallizing, water-soluble salts. The following substances may be mentioned as final products: 2-(dimethylamino-methyl)-indene, 2-(diethylamino-methyl)-indene, 2-(dipropylamino - methyl)-indene, 2-(dibutylamino - methyl)-indene, 2-(N-piperidino-methyl)-indene, 2-(N-morpholino-methyl)-indene, 2-(1'-dimethylamino-ethyl)-indene, 2-(2'-piperidino - ethyl) - indene, 2-(1'-diethylamino - 1'-methyl - ethyl)-indene, 2-(methylamino - methyl)-indene, 1 - alkyl - 2-(dialkylamino-methyl)-indenes, 1-phenyl - 2 - (dialkylamino-methyl)-indenes, 2-(dialkylamino-methyl)-3-alkylindenes, as well as the products substituted in the nucleus.

The aminoalkyl-indenes can be converted, if desired, by means of known methods into the corresponding ammonium compounds, e. g. their chlorine, bromine, or iodine alkylates and aralkylates, dialkyl-sulfonates, alkyl or aryl-sulfonates.

The products of this process are compounds of pharmacological interest which are characterized in particular by their uterotonic activity. They are intended for therapeutic use or as parent compounds for the preparation of therapeutically useful substances.

The following examples illustrate the invention, but are not to be regarded as limiting it in any way, the parts being by weight:

*Example 1*

One part of 1-α-hydroxy-2-(N-piperidinomethyl)-indane hydrochloride of the formula

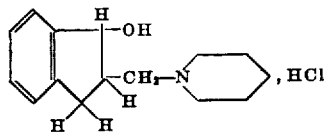

M. Pt. 206.5–207° C., is boiled under reflux for 15 minutes with 10 parts of a mixture of glacial acetic acid and concentrated hydrochloric acid in the proportion of 4:1. The solution obtained is evaporated down and the residue sharply dried in a high vacuum. In this way crystals are obtained which melt at 234–236° C., being 2-(N-piperidinomethyl)-indene hydrochloride of the formula

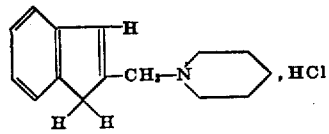

After a single recrystallization from alcohol and ethyl acetate (1:3), the substance has a constant melting point of 235–237° C. The liberated base, B. Pt.0.1 139–141° C. forms a crystalline mass, M. Pt. 36–37° C. which is readily soluble.

Suitable parent materials are also the esters or ethers of 1-α-hydroxy-2-(N-piperidino-methly)-indane hydrochloride, such as the esters of acetic, propionic, sulfonic and benzoic acid and the benzyl ether.

The parent materials can be obtained, for example, as follows:

6.6 parts of α-indanone, dissolved in 30 c. c. of absolute alcohol are heated under reflux with 3.75 parts of paraformaldehyde and 6.2 parts of piperidine hydrochloride, stirring continually. After a homogeneous solution has been obtained, stirring is continued for 30 minutes. A few drops of concentrated hydrochloric acid is added and the whole allowed to cool, when fine crystals separate out which are filtered off by suction and recrystallized from a mixture of alcohol and ethyl acetate (1:4). The 1-oxo-2-(N-piperidinomethyl)-indane hydrochloride obtained has the formula:

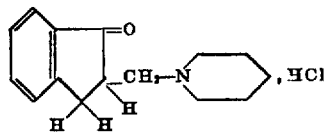

and melts purely at 214° C. with decomposition. For the reduction, 53.2 parts of this hydrochloride are dissolved in 900 parts of water, and 600 parts of 5% sodium amalgam gradually introduced into the ice-cooled solution, stirring continually. A slightly acid reaction is guaranteed by dropping in at the same time 150 parts of 50% acetic acid. At the end of the reaction, filtration is effected, the filtrate made alkaline with sodium bicarbonate solution, and the separated oily base dissolved in ether. The ethereal solution is dried over potash and evaporated down. The oily residue is dissolved in 10 times its volume of ethyl acetate and the solution neutralized with the calculated quantity of hydrochloric acid dissolved in ethyl acetate. The crystals precipitated consist of a mixture of the two possible isomeric 1-indanol derivatives, the hydrochlorides of 1-α and 1-β-hydroxy-2-(N - piperidino - methyl)-indane. The α-compound is obtained by recrystallizing the mixture from alcohol and ethyl acetate (1:2), and has a M. Pt. of 206.5–207° C. the corresponding benzoate melts at 165–166° C. The β-compound is obtained from the mother liquors by converting the hydrochloride into the free base and distilling the oil obtained. B. Pt.0.1 128–129° C. M. Pt. (hydrochloride) 169–170° C.

*Example 2*

One part of 1-β-hydroxy-2-(N-piperidinomethyl)-indane hydrochloride of the formula

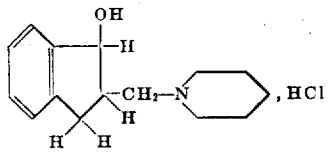

and melting at 169–170° C. (obtained for example as described in Example 1) is boiled for a short time with 2 parts of hydrochloric acid and the reaction solution evaporated down to dryness in vacuo. In this way 2-(N-piperidinomethyl)-indene hydrochloride, M. Pt. 235–237° C., is obtained, from which the free base melting at 36–37° C. is isolated.

1.1 parts of 2-(N-piperidino-methyl)-indene are dissolved in 2 parts of acetone and warmed for a short time with one part of methyl iodide. The iodo-methylate soon crystallizes out and melts at 168–170° C. (recrystallized from a mixture of alcohol and ethyl acetate).

3.5 parts of the above iodo-methylate are shaken up for several hours with 2 parts of freshly prepared silver chloride in the presence of water, filtered, and the aqueous solution evaporated down. 2-(N-piperidino-methyl)-indenechlor-methylate of the formula

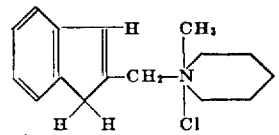

is obtained, which forms crystals which are easily soluble in water.

The dimethylsulfonate, M. Pt. 115–117° C. is obtained in an analogous way.

*Example 3*

A solution of 1 part of a mixture of the stereoisomeric 1 - hydroxy-2-(N-morpholino-methyl)-indane hydrochlorides of the general formula

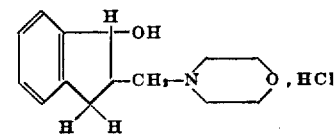

in 10 parts of glacial acetic acid is boiled under reflux for 30 minutes with 3 parts of concentrated hydrochloric acid. The solution obtained is evaporated down, the residue crystallizing out after sharp drying. The 2-(N-morpholino-methyl)-indene hydrochloride of the formula

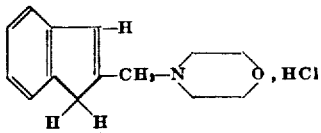

which is so obtained can be recrystallized from alcohol, and melts at 234–235° C. The free base boils at 115–120° C. under 0.2 mm. pressure. M. Pt. 57–59° C.

The parent material can be prepared, for example, as follows:

5.3 parts of α-indanone, 1.32 parts of paraformaldehyde and 4.92 parts of morpholine hydrochloride are slowly heated in 30 parts of dioxane, stirring continually. A vigorous reaction soon sets in and the mixture is left to itself without further application of heat. This homogeneous mixture becomes interspersed after a short time with a voluminous crystalline mass. After cooling, the latter is filtered off by suction and recrystallized from 98% alcohol. The 1-oxo - 2 - (N-morpholino-methyl)-indane hydrochloride has the formula

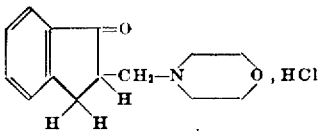

and melts at 160–161° C. 1 part of this hydrochloride in 10 parts of glacial acetic acid is hydrogenated in the presence of 0.1 part of platinum oxide. After the calculated quantity of hydrogen has been absorbed, the hydrogenation is interrupted and the platinum filtered off from the glacial acetic acid solution. The latter contains the isomeric 1-α-hydroxy and 1-β-hydroxy-2-(N-morpholino-methyl)-indane hydrochloride and can be treated immediately with concentrated hydrochloric acid to eliminate water.

*Example 4*

1 part of the mixture of stereo-isomeric-1-hydroxy-2-(dimethylamino-methyl)-indanes of the general formula

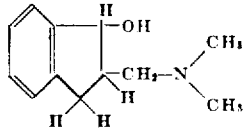

(prepared for example by the condensation of α-indanone with formaldehyde and dimethylamine, and reduction of the 1-oxo-2-(dimethylamino-methyl)-indane so obtained with aluminium amalgam) is allowed to stand for a few days after dissolving in 3 parts of 48% hydrobromic acid. The base is then liberated, B. Pt.₀.₁ 100–105° C. The hydrochloride forms crystals melting at 209–210° C. after recrystallizing from alcohol and ethyl acetate. It is 2-(dimethylamino-methyl)-indene hydrochloride of the formula

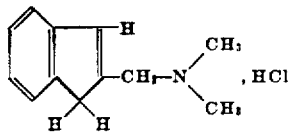

In analogous manner there can be obtained for example the 5-methoxy-2-(N-piperidino-methyl)-indene which forms an oil of boiling point 134–136° C. under 0.07 mm. pressure crystallizing on standing and a hydrochloride of melting point 192–194° C., further also analogous derivatives having alkoxy- or hydroxy groups, for example in 5- or 7-position, and derivatives which are substituted in the five-membered ring for example by alkyl groups.

*Example 5*

8 parts of concentrated hydrochloric acid are added to a solution of 3.7 parts of a mixture of the stereo-isomeric 1-methyl-1-hydroxy-2-(N-piperidino-methyl)-indanes of the formula

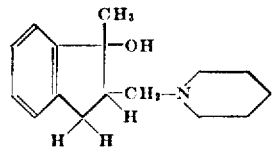

in 37 parts of glacial acetic acid, the wine red solution heated to boiling for 15 minutes and evaporated down. The crystalline residue is 1-methyl-2-(N-piperidino-methyl)-indene hydrochloride of the formula

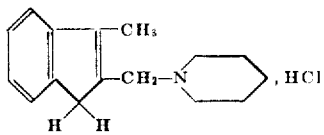

which, on recrystallization from 95% alcohol forms crude crystals, which melt at 259° C. The free base boils at 125–127° C. under 0.15 mm. pressure.

The parent material can be prepared in the following way:

From an ice-cooled solution of 53.2 parts of the 1-oxo-2-(N-piperidino-methyl) - indane hydrochloride M. Pt. 214° C. described in Example 1, the base is liberated with ammonia and dissolved in ether. The well-dried ethereal extract is dropped into a Grignard solution (prepared from 60 parts of methyl iodide and 11.5 parts of magnesium turnings in ether) so rapidly that the mixture is kept boiling. It is then boiled for a further 15 minutes on a water-bath, and decomposed with ice and ammonium chloride solution. A rather tiresome emulsion is formed which is separated into two layers by the addition of 50% acetic acid. The dried ethereal layer is evaporated down and the residue stirred up with petroleum ether (B. Pt. 50° C). The portion soluble in petroleum ether contains the isomeric 1-methyl-1-hydroxy-2-(N - piperidino - methyl)-indanes, from which water can be immediately eliminated.

In a similar way the isomeric 1-ethyl-1-hydroxy-2-(N - piperidino - methyl)-indanes, and from them the 1-ethyl-2-(N-piperidino-methyl)-indene of the formula

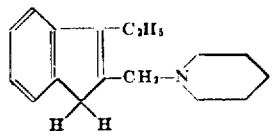

can be prepared. M. Pt.₀.₁ 132–135° C. M. Pt. of the hydrochloride 242–243° C.

The 1-phenyl-2-(N-piperidino-methyl)-indene obtained in similar manner forms an oil of B.

Pt.₀.₄ 190° C. and a hydrochloride of melting point 230–232° C.

When using as starting materials 1-hydroxy-2-(N-piperidino-methyl)-indanes containing in 1-position for example an allyl, ethinyl or vinyl group, there are obtained the corresponding 1-allyl- or 1-ethinyl- as well 1-vinyl-2-(N-piperidino-methyl)-indenes.

Example 6

1 part of the mixture of the stereoisomeric 1-hydroxy-2-(methylamino-methyl)-indane of the formula

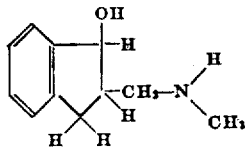

is dissolved in 2 parts of concentrated hydrochloric acid and the solution allowed to stand for 24 hours. The mixture is then heated to 50° C. for 30 minutes, diluted with water, and the base liberated. B. Pt.₀.₀₆ 76–78° C. On recrystallizing from a mixture of alcohol and ethyl acetate, the hydrochloride forms colourless platelets which melt at 212–213° C. They are 2-(methylamino-methyl)-indene hydrochloride of the formula

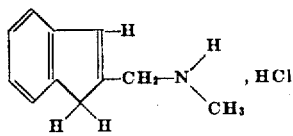

The parent material can be prepared, for example, as follows:

5.3 parts of α-indanone, 1.32 parts of paraformaldehyde and 8 parts of methylbenzylaminohydrobromide are boiled up for a short time in 30 parts of dioxane. On cooling, 1-oxo-2-(N-methylbenzylamino-methyl)-indane hydrobromide of the formula

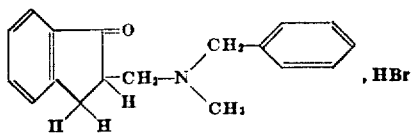

separates out from the homogeneous solution. It melts at 153–154° C. Into an ice cooled aqueous solution of 22.4 parts of this compound, 540 parts of 5% sodium amalgam are added, stirring continually. The solution is kept slightly acid by simultaneously dropping in 50% acetic acid. Filtration is carried out and the base liberated from the acid filtrate. It is purified by distillation. The fraction passing over at 160–170° C. at 0.1 mm. pressure consists of a mixture of the stereoisomeric 1-hydroxy-2-(N-methyl-benzylamino-methyl)-indane. To split off the benzyl group, an alcoholic solution of 6.4 parts of the latter product is shaken up in an atmosphere of hydrogen at 40–50° C. in the presence of 0.1 part of palladium black. The quantity of hydrogen calculated for one mol. is absorbed. After filtering off and evaporating down, caustic soda is added and the mixture of stereoisomeric 1-hydroxy-2-(methylamino-methyl)-indanes obtained, from which water can be directly eliminated.

What we claim is:

1. A process for the manufacture of an aminomethyl-indene, which comprises treating an indane compound of the formula

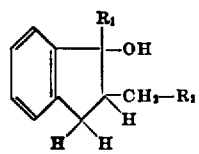

wherein $R_1$ is a member selected from the group consisting of hydrogen and a hydrocarbon radical, and —$CH_2$—$R_2$ stands for a radical selected from the group consisting of alkylaminomethyl, dialkylamino methyl, piperidino-methyl and morpholinomethyl, with a dehydrating agent, whereby the free hydroxyl group is eliminated together with the hydrogen atom attached to the adjacent carbon atom with the formation of a double bond.

2. A process for the manufacture of an aminomethyl-indene, which comprises treating an indane compound of the formula

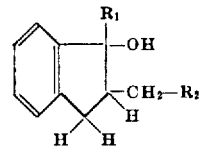

wherein $R_1$ is a member selected from the group consisting of hydrogen and a hydrocarbon radical, and —$CH_2$—$R_2$ stands for a radical selected from the group consisting of alkylamino-methyl, dialkylaminomethyl, piperidino-methyl and morpholinomethyl, with a dehydrating agent, whereby the free hydroxyl group is eliminated together with the hydrogen atom attached to the adjacent carbon atom with the formation of a double bond, and converting the resultant amine into a corresponding quaternary ammonium compound by treatment with a quaternating agent.

3. A process for the manufacture of a 2-(dialkylamino-methyl)-indene, which comprises treating an indane compound of the formula

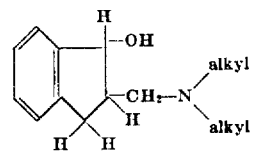

with a dehydrating agent, whereby the free hydroxyl group is eliminated together with the hydrogen atom attached to the adjacent carbon atom with the formation of a double bond.

4. A process for the manufacture of 2-(N-piperidino-methyl)-indene, which comprises treating 1-hydroxy-2-(N-piperidino-methyl)-indane of the formula

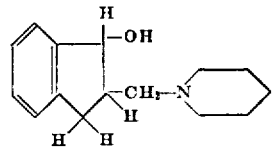

with a hydrohalic acid, thereby splitting off the hydroxyl group together with the hydrogen atom attached to the neighboring carbon atom with the formation of a double bond.

5. A number selected from the group consisting of the 2-aminomethyl-indenes of the formula

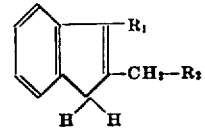

wherein $R_1$ is a member selected from the group consisting of hydrogen and a hydrocarbon radical, and —$CH_2$—$R_2$ stands for a radical selected from the group consisting of alkylamino-methyl, dialkylaminomethyl, piperidino-methyl and morpholino-methyl, and the corresponding halogen alkylates and aralkylates, the corresponding dialkyl, alkyl and aryl sulfonates, and the corresponding hydrohalides.

6. A 2-(dialkylamino-methyl)-indene of the formula

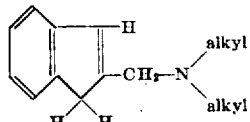

7. The 2-(N-piperidino-methyl)-indene of the formula

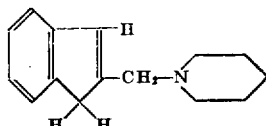

the hydrochloride of which melts at about 235–237° C.

KARL HOFFMANN.
HENRI SCHELLENBERG.
KARL MIESCHER.

REFERENCES CITED

The following references are of record in the file of this patent:

UNITED STATES PATENTS

| Number | Name | Date |
|---|---|---|
| 2,188,870 | Bockmuhl | Jan. 30, 1940 |
| 2,265,174 | Kendall | Dec. 9, 1941 |

OTHER REFERENCES

Karrer, "Organic Chemistry" (Nordemann Publishing Company; New York; 1938); pages 42 and 47.

Fieser et al., "Organic Chemistry" (D. C. Heath & Company; Boston; 1944); pages 54–58.

Beilstein, "Handbuch, etc."; volume IV (1922); pages 205 and 225.

Certificate of Correction

Patent No. 2,441,069.  May 4, 1948.

KARL HOFFMANN ET AL.

It is hereby certified that errors appear in the printed specification of the above numbered patent requiring correction as follows: Column 1, lines 33 and 34, for "substitued" read *substituted*; line 40, for "amalgan" read *amalgam*; line 52, for "carbonols" read *carbinols*; column 4, line 18, after "207° C." insert a semi-colon; column 8, line 68, claim 5, for "number" read *member*; and that the said Letters Patent should be read with these corrections therein that the same may conform to the record of the case in the Patent Office.

Signed and sealed this 26th day of October, A. D. 1948.

[SEAL]

THOMAS F. MURPHY,
*Assistant Commissioner of Patents.* wherein $R_1$ is a member selected from the group consisting of hydrogen and a hydrocarbon radical, and —$CH_2$—$R_2$ stands for a radical selected from the group consisting of alkylamino-methyl, dialkylaminomethyl, piperidino-methyl and morpholino-methyl, and the corresponding halogen alkylates and aralkylates, the corresponding dialkyl, alkyl and aryl sulfonates, and the corresponding hydrohalides.

6. A 2-(dialkylamino-methyl)-indene of the formula

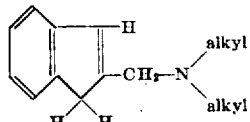

7. The 2-(N-piperidino-methyl)-indene of the formula

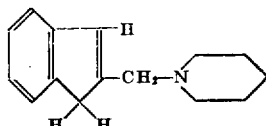

the hydrochloride of which melts at about 235–237° C.

KARL HOFFMANN.
HENRI SCHELLENBERG.
KARL MIESCHER.

REFERENCES CITED

The following references are of record in the file of this patent:

UNITED STATES PATENTS

| Number | Name | Date |
|---|---|---|
| 2,188,870 | Bockmuhl | Jan. 30, 1940 |
| 2,265,174 | Kendall | Dec. 9, 1941 |

OTHER REFERENCES

Karrer, "Organic Chemistry" (Nordemann Publishing Company; New York; 1938); pages 42 and 47.

Fieser et al., "Organic Chemistry" (D. C. Heath & Company; Boston; 1944); pages 54–58.

Beilstein, "Handbuch, etc."; volume IV (1922); pages 205 and 225.

Certificate of Correction

Patent No. 2,441,069.     May 4, 1948.

KARL HOFFMANN ET AL.

It is hereby certified that errors appear in the printed specification of the above numbered patent requiring correction as follows: Column 1, lines 33 and 34, for "substitued" read *substituted*; line 40, for "amalgan" read *amalgam*; line 52, for "carbonols" read *carbinols*; column 4, line 18, after "207° C." insert a semi-colon; column 8, line 68, claim 5, for "number" read *member*; and that the said Letters Patent should be read with these corrections therein that the same may conform to the record of the case in the Patent Office.

Signed and sealed this 26th day of October, A. D. 1948.

[SEAL]

THOMAS F. MURPHY,
*Assistant Commissioner of Patents.*